United States Patent
Biernath et al.

[11] Patent Number: 5,839,263
[45] Date of Patent: Nov. 24, 1998

[54] LAWNMOWER BLADE WITH REPLACEABLE KNIVES

[76] Inventors: Horst Fred Biernath, 4550 Runnemede Rd. NW., Atlanta, Ga. 30327; Mark Erich Biernath, 2460 Cogburn Ridge Rd., Alpharetta, Ga. 30004; Rolf Werner Biernath, 405 Crestview Dr., Maplewood, Minn. 55119

[21] Appl. No.: 905,074

[22] Filed: Aug. 1, 1997

[51] Int. Cl.$^6$ ............................................. A01D 34/73
[52] U.S. Cl. ..................... 56/255; 56/17.5; 56/DIG. 17; 56/DIG. 20
[58] Field of Search .............................. 56/255, 295, 17.5, 56/DIG. 17, DIG. 20

[56] References Cited

U.S. PATENT DOCUMENTS

| | | |
|---|---|---|
| 2,786,322 | 3/1957 | McEvers . |
| 2,869,311 | 1/1959 | Beeston . |
| 2,932,147 | 4/1960 | Beeston . |
| 3,097,468 | 7/1963 | Johnson . |
| 3,243,944 | 4/1966 | Michaud . |
| 3,247,657 | 4/1966 | Scarnato et al. . |
| 3,327,460 | 6/1967 | Blackstone . |
| 3,415,047 | 12/1968 | Blecke . |
| 3,514,935 | 6/1970 | Bonsor . |
| 3,563,015 | 2/1971 | Renfroe . |
| 3,665,692 | 5/1972 | Hughes . |
| 3,762,138 | 10/1973 | Michael ..................................... 56/295 |
| 3,769,784 | 11/1973 | Jones . |
| 3,975,891 | 8/1976 | Gunther ..................................... 56/295 |
| 4,043,104 | 8/1977 | Jones ......................................... 56/295 |
| 4,229,933 | 10/1980 | Bernard ................................. 56/295 X |
| 4,338,771 | 7/1982 | Hummel et al. .......................... 56/294 |
| 4,375,148 | 3/1983 | Beck . |
| 4,445,315 | 5/1984 | Roszkowski . |
| 4,471,603 | 9/1984 | Veltin . |
| 4,594,843 | 6/1986 | Anderson . |
| 4,651,510 | 3/1987 | Malutich . |
| 4,750,320 | 6/1988 | Liebl . |
| 4,779,407 | 10/1988 | Pattee . |
| 5,018,347 | 5/1991 | Feilen . |
| 5,036,654 | 8/1991 | Malutich . |
| 5,063,731 | 11/1991 | Hull . |
| 5,271,212 | 12/1993 | Anderson . |
| 5,303,535 | 4/1994 | Smith . |
| 5,383,329 | 1/1995 | Cornell . |
| 5,467,586 | 11/1995 | Lin et al. ............................... 56/295 X |
| 5,619,847 | 4/1997 | Cox, Jr. ..................................... 56/255 |

*Primary Examiner*—Heather Shackelford

[57] ABSTRACT

A lawnmower blade with replaceable knife members (40) mounted on the leading edge of a rotating blade body wherein the entire assembly to a rotating shaft of a lawnmower or the like. The knife member (40) is manufactured from carbides, high speed steels, or powder metals, thus producing a cutting edge with high quality and durability. Knife member is attached to a rotating body in either a safety cage assembly (100) or embedded in the body of the blade. The knife member is retained on the blade body and can be rotated to a fresh sharp edge or replaced.

11 Claims, 21 Drawing Sheets

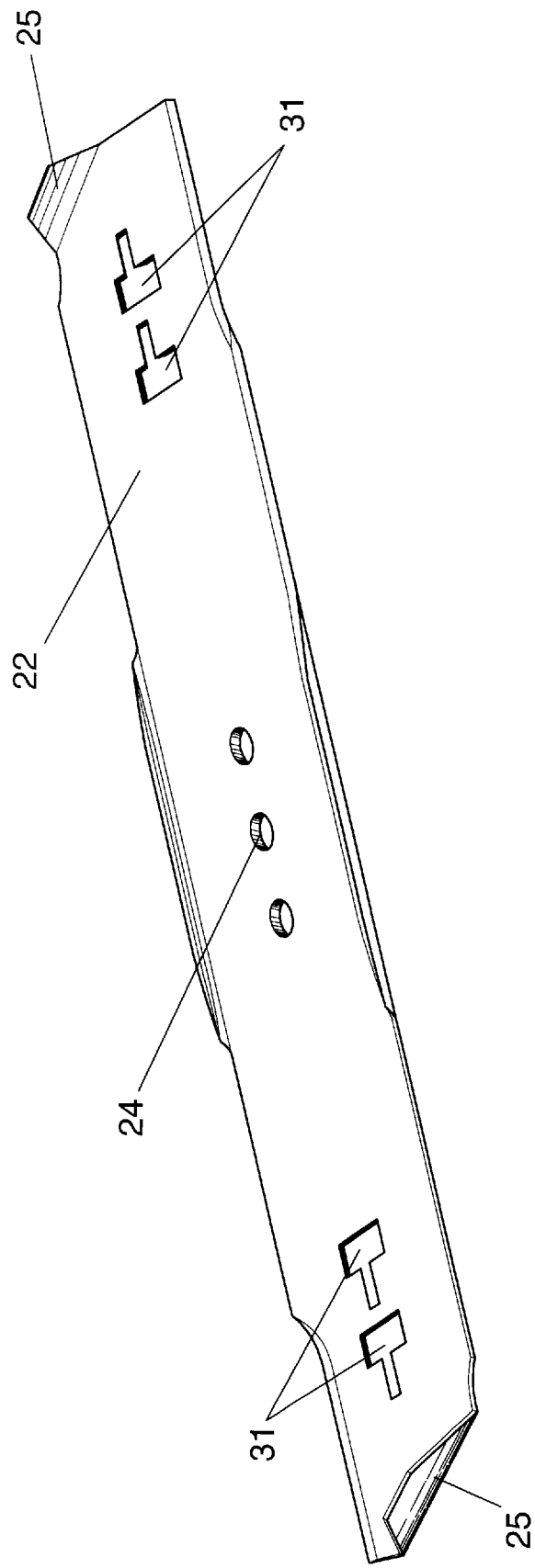

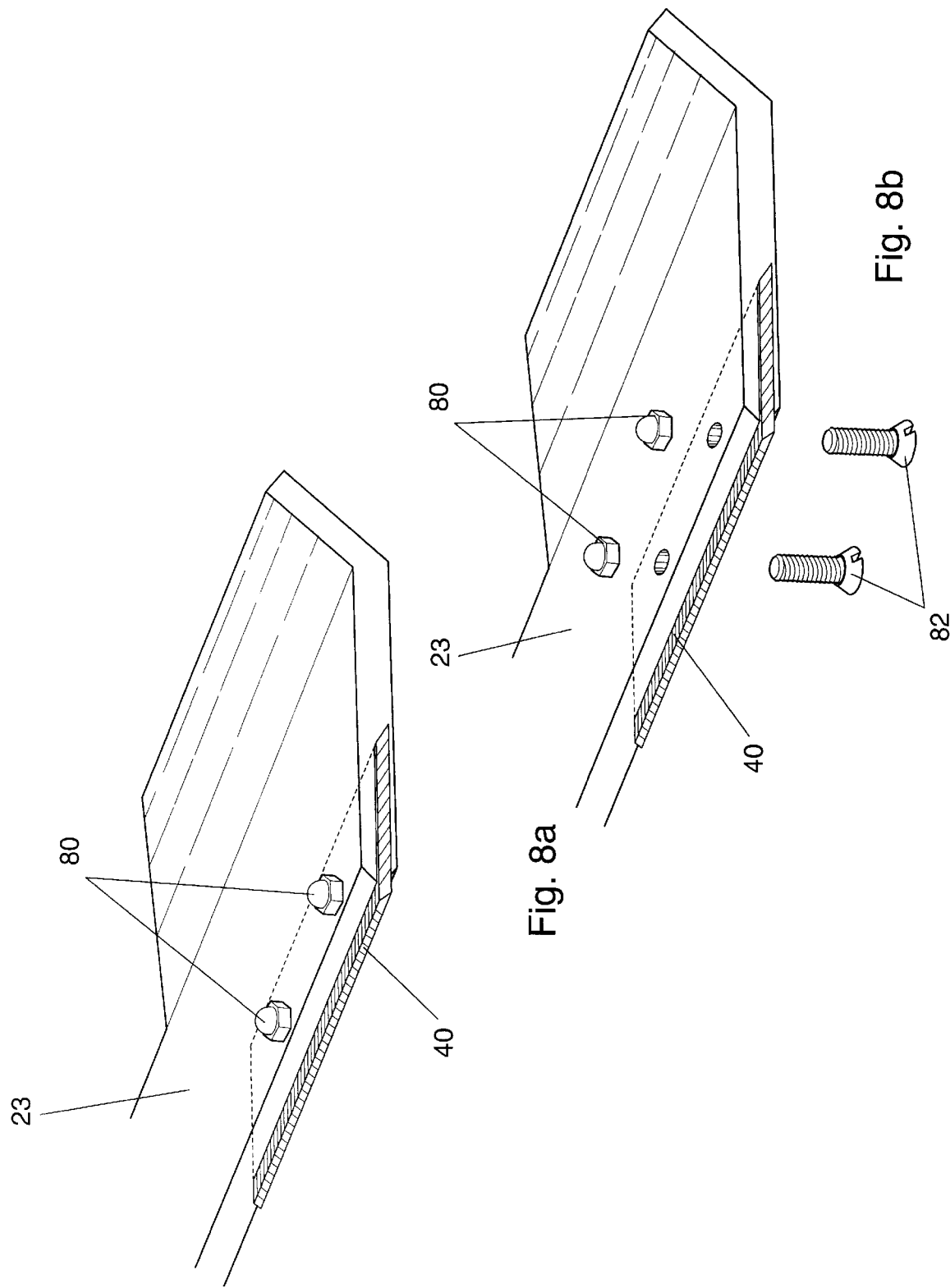

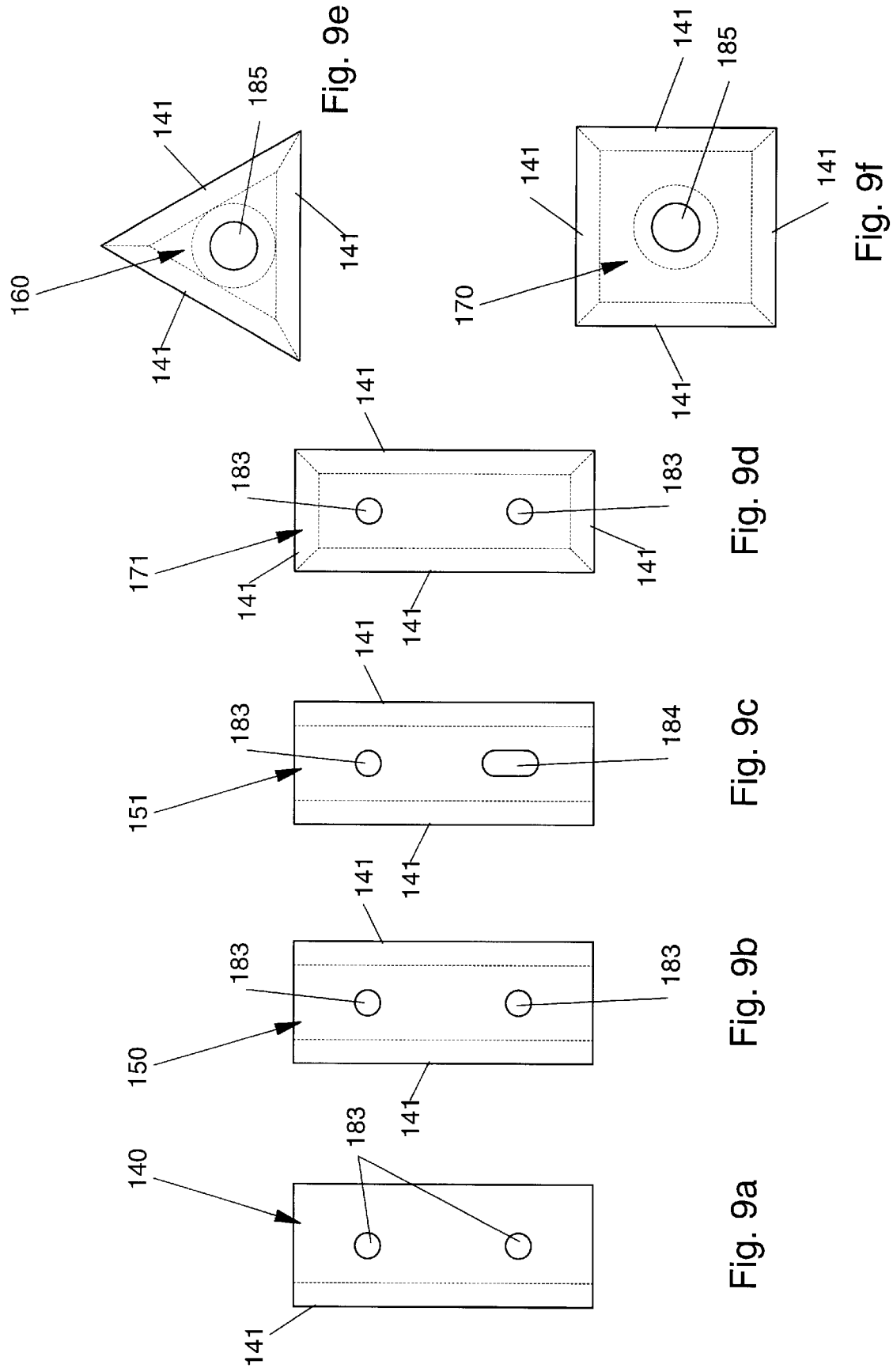

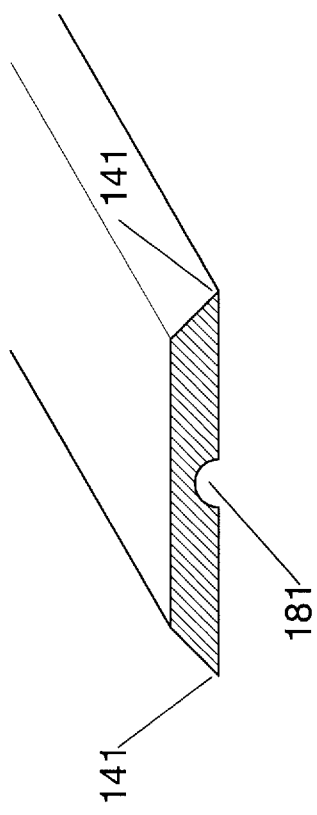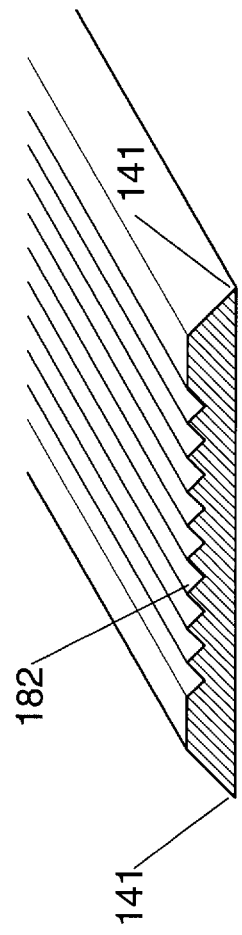

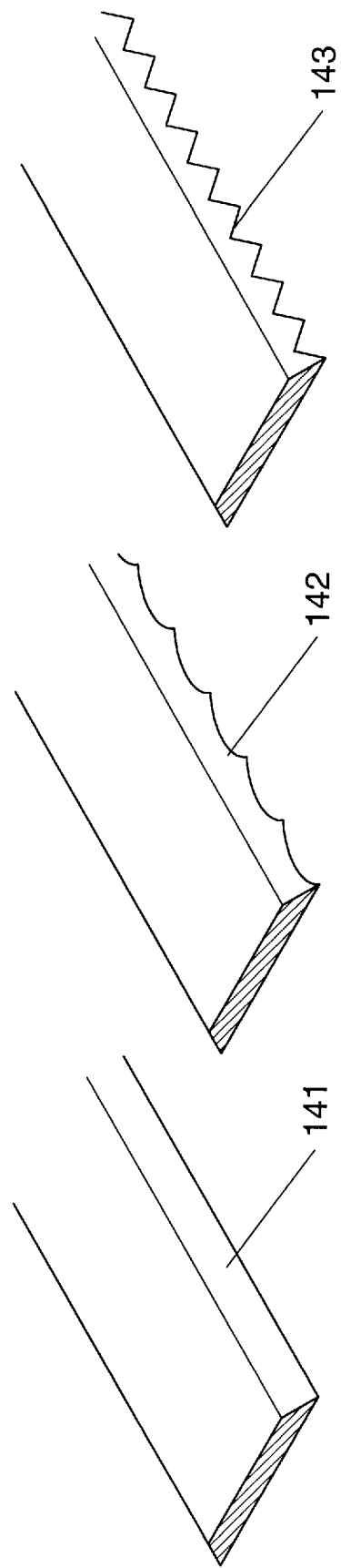

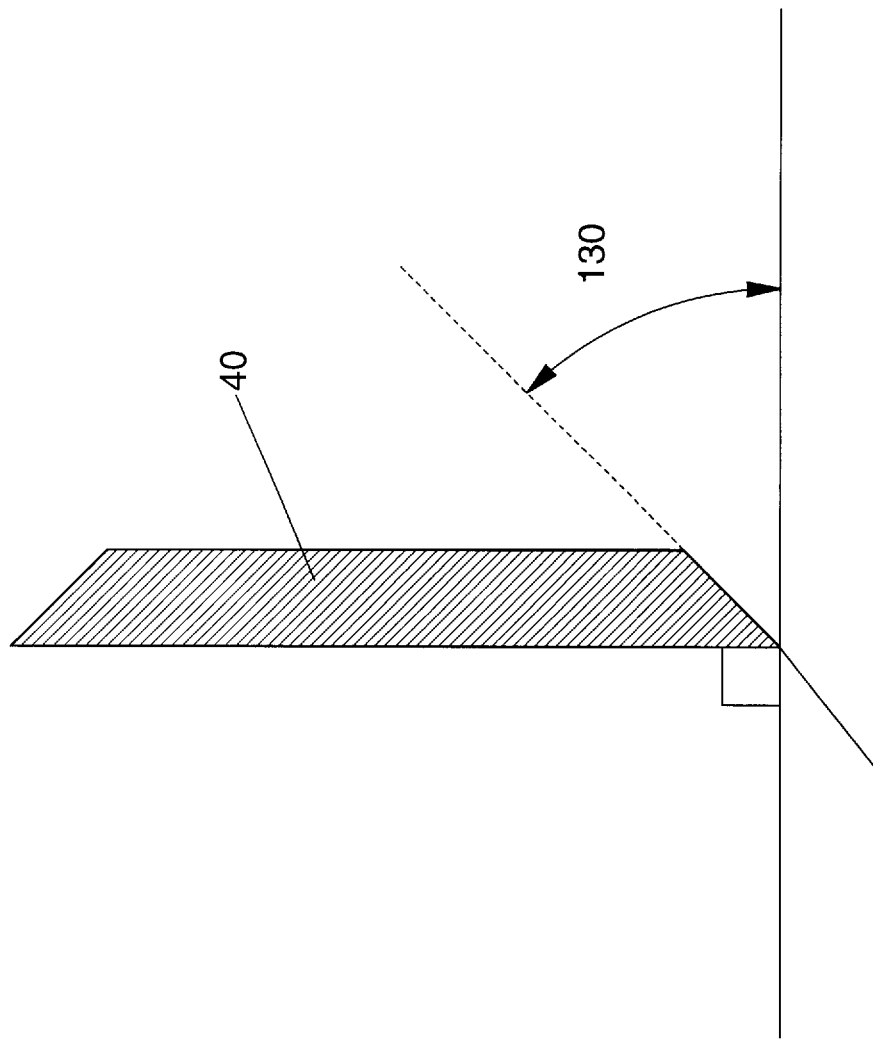

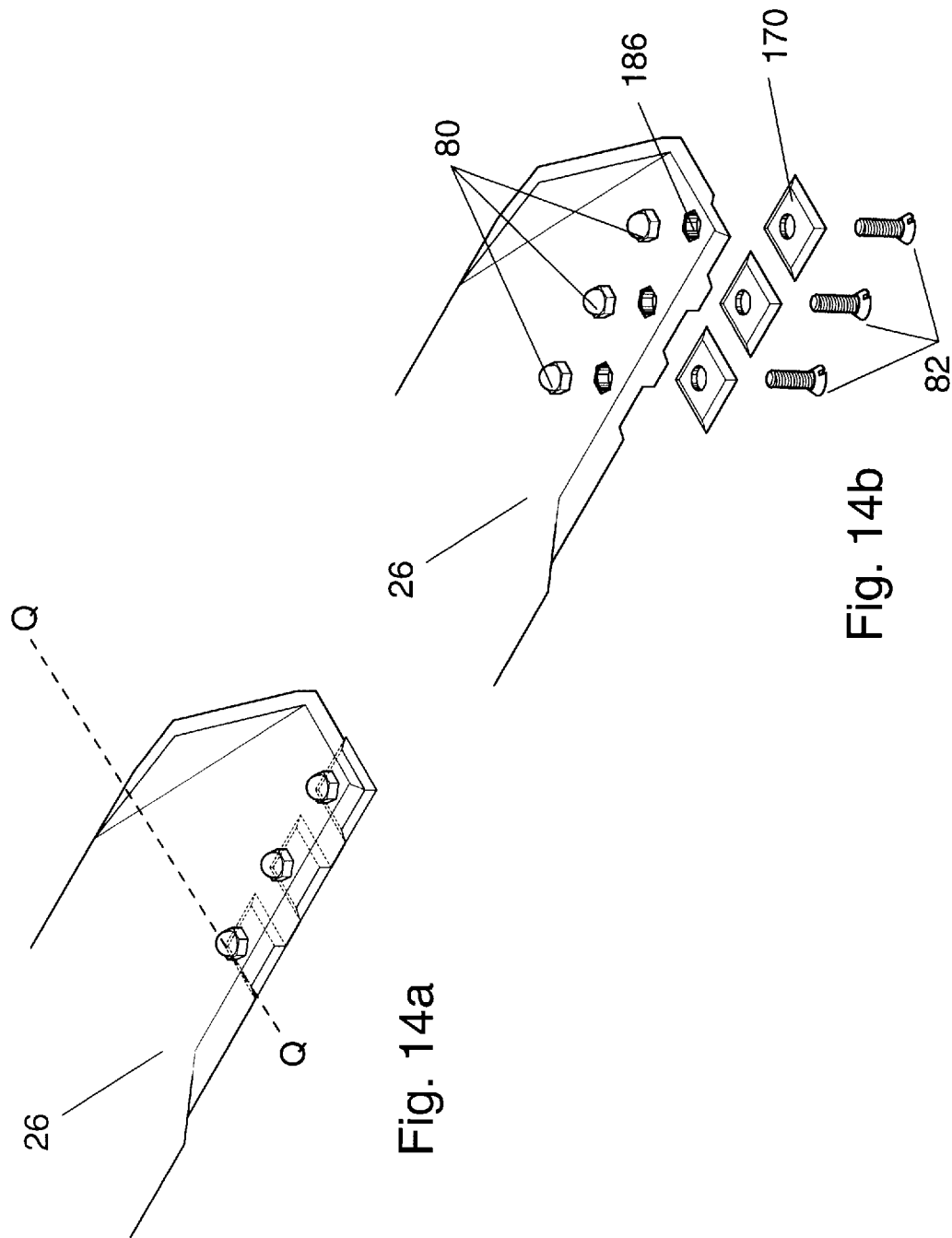

LAWNMOWER BLADE WITH REPLACEABLE KNIVES

BACKGROUND—FIELD OF INVENTION

The invention relates to lawn mower blades and related blades such as brush cutting blades and farm-scale mower blades. More particularly, it relates to replaceable cutting edges for such blades. Most importantly, it relates to means of improving safety for such replaceable blades.

Definition of Terms

Blade body or blade—the rotating member on the lawnmower; conventionally what is thought of as the lawnmower blade, not including the cutting edge.

Cutting edge—the surface that does the cutting (eg. The edge of a razor blade).

Knife member (cutter)—the component of which the cutting edge is integral (eg. A knife or razor blade).

Safety cage assembly—a unit comprised of a knife member sandwiched between a knife holder and a clamping member which is mounted onto the blade (includes attachment hardware).

Clamping member, or clamp—a unit which exerts clamping force on the knife member to retain said knife member in predetermined position.

Knife holder—a unit which positions the knife member at the predetermined rake and shear angle, so that the cutting edge is exposed to the vegetation or grass.

Integrated knife holder—that part of the modified blade, on the leading edge that positions the knife member to cut the vegetation.

Knife countersink—that part of the blade, on the leading edge which is countersunk to accommodate the knife member and position said knife member to cut the vegetation or grass.

Rake angle—the angle of the plane of the knife member to the plane of rotation.

Shear angle—the angle of the longitudinal line of the cutting edge to the vortex of rotation.

Source of rotation—any means to rotate the blade and move it across the surface of vegetation, commonly referred to as a lawn mower.

Counterbalance—a weight secured to the opposite end of a blade body to ensure the center of gravity is at the center of the spindle hole.

BACKGROUND OF INVENTION

The patent art is filled with removable cutting edges for lawnmower blades and the like. The many patents underline the need for improving the existing lawn mower blade, because the cutting edge dulls too quickly. Commercial lawn mowing services, especially, find it necessary to frequently resharpen the standard blades at significant expense in terms of labor involved and loss of service for the equipment. The inventors seeking to meet that need all realized the importance of removability and replaceability of the cutting edge, owing to the significant cost in money and lost work time of removing the blades and sharpening them. However, the primary content of all the patents involves primarily clever techniques for mounting the cutting edges to the lawnmower blades.

| U.S. Pat. No. | Date | Inventor |
|---|---|---|
| U.S. 2,869,311 | 1/20/59 | Beeston |
| U.S. 2,932,147 | 4/12/60 | Beeston |
| U.S. 3,097,468 | 1/16/62 | JOhnson |
| U.S. 3,243,944 | 5/05/66 | Michaud |
| U.S. 3,327,460 | 6/27/67 | Blackstone |
| U.S. 3,514,935 | 9/13/66 | Bonsor |
| U.S. 3,563,015 | 5/21/68 | Renfroe |
| U.S. 3,665,692 | 5/30/72 | Hughes |
| U.S. 3,769,784 | 11/06/73 | Jones |
| U.S. 4,375,148 | 3/01/83 | beck |
| U.S. 4,445,315 | 5/01/84 | Roszkowski |
| U.S. 4,471,603 | 9/18/84 | Veltin |
| U.S. 4,594,843 | 6/17/86 | Anderson |
| U.S. 4,651,510 | 3/24/87 | Malutich |
| U.S. 4,750,320 | 6/14/88 | Liebl |
| U.S. 4,779,407 | 10/25/88 | Pattee |
| U.S. 5,018,347 | 5/28/91 | Feilen |
| U.S. 5,036,654 | 8/06/91 | Malutich |
| U.S. 5,063,731 | 11/12/91 | Hull |
| U.S. 5,271,212 | 12/21/93 | Anderson |
| U.S. 5,303,535 | 4/19/94 | Smith |
| U.S. 5,383,329 | 1/24/95 | Cornell |

All the cutting-edge members were of special design, not commonly available. This made economical manufacture difficult. The special designs all required special tooling and manufacturing, thereby increasing their cost, our invention makes use of knives that are currently being mass produced.

None of the prior art specify knife materials with the specific characteristic of long cutting edge life, materials such as carbides, high speed steels, or chrome steels. These high performance materials are very difficult to shape into the complex shapes specified by the earlier inventions.

A key goal of the consumer is to save money and get a better product. The manufacturability issues cause one to wonder if the economics of the earlier designs could ever truly result in lower cost to the consumer. The safety issues seem to outweigh the benefit of easy cutting-edge replacement, thereby bringing into question whether these are truly perceived to be better products.

The consumer desires better than the current lawnmower blades, but the needs of cost, safety, and quality must be all satisfied. We believe that our invention accommodates all of these important needs.

OBJECTS AND ADVANTAGES

Currently lawn mower blades are made from a relatively soft tool steel which is easy to form and inexpensive to produce. The blades, however, do not hold a sharp edge, in many cases as little as four hours of use will render them dull. By using high speed steel (HSS) the knife will hold its sharp edge up to 10 times longer, 40–60 hours of use under normal conditions. Carbide on the other hand, while a more expensive metal, will last over 100 times longer than the current tool steel. By using high speed steel or carbide knives, the cutting edge can be sharper than can currently be achieved by tool steel. This will result in a cleaner cut, which leaves a lawn looking better and less prone to disease.

The prior art fully recognizes the need to have a sharp edge on the lawn mower blade, but the specific material the cutting edge is made from offers no improvement to the existing blade. Our invention enables and specifies the better materials which are currently being manufactured in large quantities for use in the woodworking industry. Utilizing these materials in the unrelated field of lawn mowing, had not been previously considered by the prior art.

By making the knife edge replaceable we eliminate the costly and time consuming practice of removing the blades from the mower, grinding a new sharp edge on the blade, and reattaching the blade to the mower. Because this must be done so often, lawn care professionals usually maintain multiple sets of blades for their equipment. They also employ people and maintain expensive grinding equipment to sharpen their blades or they send the blades to a grinding shop and pay significantly for the service. With a replaceable knife, the knife can be changed without removing the blades from the mower. With a replaceable, mass-produced knife, this can be achieved even more economically. A safety cage for the knife offers an additional element of protection to the user. The only equipment needed would be simple, inexpensive hand tools.

DESCRIPTION OF FIGURES

FIG. 7a Slidably attached blade body for slidably attached safety cage assembly.

FIG. 8a Assembled knife embedded in a slot in the body of the blade.

FIG. 8b View of FIG. 8a showing bolts with countersink heads.

FIG. 9a–f Top view of knives with one, two, three, and four cutting edges.

FIG. 10a–d View of additional features to position and secure knife in safety cage.

FIG. 11a–c Types of cutting edge.

FIG. 12b Free angle.

FIG. 14a Embedded blade body with countersink for knife member.

FIG. 14b Exploded view of FIG. 14a.

FIG. 14c Cross-sectional view of FIG. 14a.

FIG. 15a–c Various embodiments of device from FIG. 14a.

Figure 1:
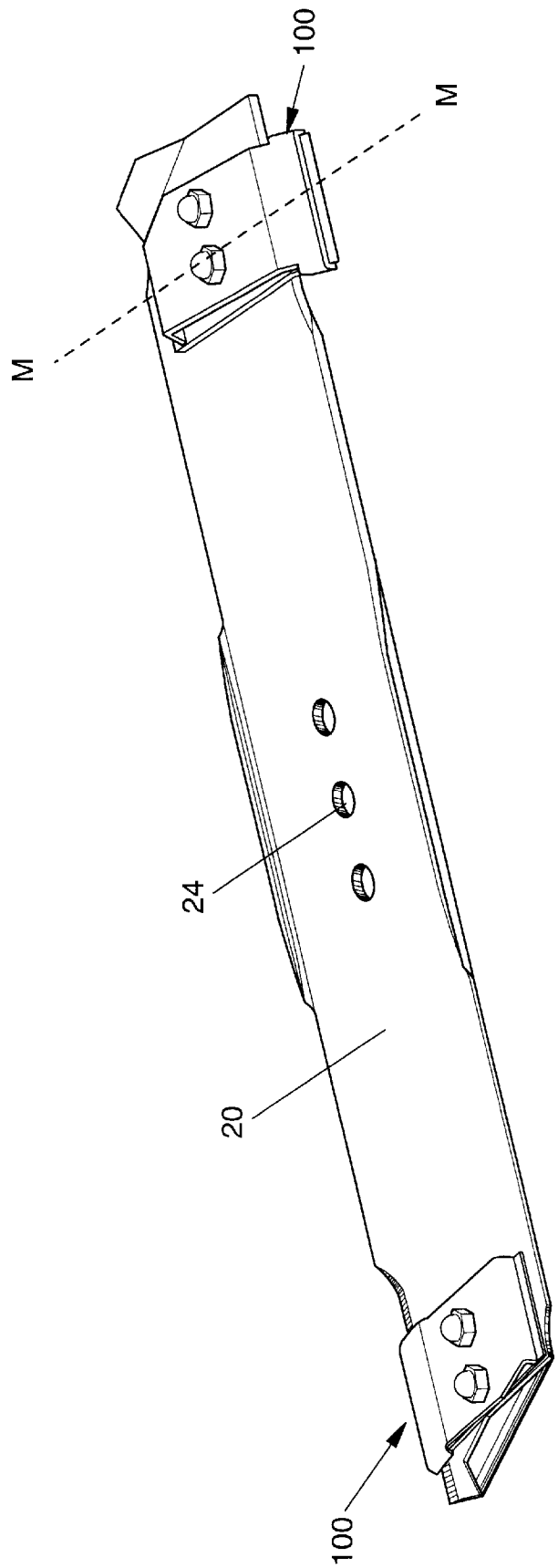
FIG. 1 Standard blade body with safety cage assembly attached.

| Part | Listing by Number |
|------|-------------------|
| 20 | Blade body |
| 21 | Blade body with integrated knife member holder |
| 22 | Blade body for slidably attached safety cage assembly |
| 23 | Slotted blade body |
| 24 | Drive-shaft hole |
| 25 | Deflector |
| 26 | Embedded blade body |
| 30 | Holes for attaching safety cage assembly |
| 31 | Dovetail slots |
| 40 | Knife member |
| 50 | Holder |
| 51 | Positioning pin |
| 60 | Clamp |
| 61 | Safety lip |
| 70 | Positioning pins |
| 80 | Acorn-nut |
| 81 | Bolt |
| 82 | Bolt with countersink-head |
| 90 | Dovetail head bolts |
| 100 | Safety cage assembly consisting of knife member, holder, clamp, positioning pins, nuts, and bolts |
| 101 | Slidably attached safety cage assembly consisting of knife member, holder, clamp, positioning pins, nuts, and dovetail head bolts |
| 110 | Cut angle |
| 120 | Rake angle |
| 130 | Clearance Angle |
| 135 | Negative shear |
| 136 | Neutral shear |
| 137 | Positive shear |
| 140 | Knife member with single cutting edge |
| 141 | Straight cutting edge |
| 142 | Scalloped cutting edge |
| 143 | Serrated cutting edge |
| 150 | Knife member with 2 cut edges |
| 151 | Knife member with 2 cut edges and an elongated pin hole |
| 160 | Knife member with three cut edges |
| 170 | Square knife member with four cut edges |
| 171 | Rectangular knife member with four cut edges |
| 181 | Groove |
| 182 | Corrugation |
| 183 | Round pin hole |
| 184 | Elongated pin hole |
| 185 | Counter-sunk hole |
| 186 | Countersink for nut |

SUMMARY OF INVENTION

Professional users of lawn mowing machines find it necessary to resharpen their blades frequently, and are spending a substantial amount of time per week on such maintenance.

Our invention makes use of thin, double edged carbide or high speed steel knives to improve the quality of cut, length of service life, and reduce cost of operation of walk-behind or riding lawn mowers. Having two or more cutting edges on the knife member allows the user to rotate the knife member when one edge is dull, thereby gaining the use of two or more lifetimes for the price of one. The same idea will make use of nylon or other low cost knife member insert as the cutting edge part, for use in the consumer market. These knives are already in mass production with a reasonable cost.

Additionally, since the cutting edge is now decoupled from the remainder of the lawnmower blade, the lawnmower blade may be from a plastic, aluminum, rubber, or other such soft material which would otherwise be unsuitable as a standard lawnmower blade material—the result of this is to allow lower cost manufacturing processes such as injection molding and thermoforming to be utilized.

Additionally, a safety cage is used to contain the knife member in the unfortunate event that the knife breaks. Our invention enables the long life characteristics of carbide to be used at the cutting edge. We have not found any patents suggesting use of carbide, high speed steel or injection molding in connection with lawn mower blades.

DESCRIPTION OF INVENTION

Description FIGS. 1–6

FIG. 1 shows an overall view of the invention in a safety cage assembly (100) embodiment.

Figure 2:
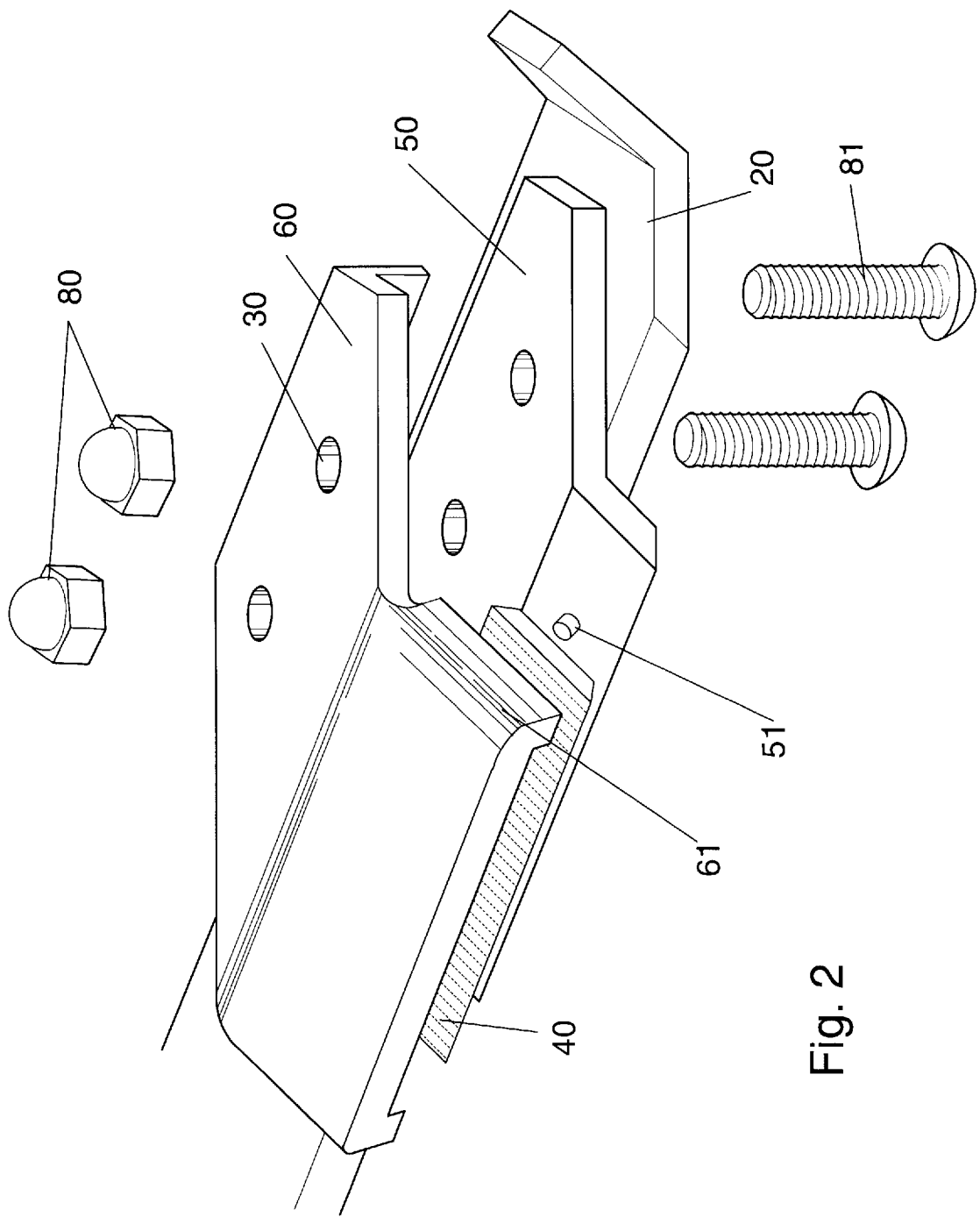
FIG. 2 Exploded view of safety cage assembly and blade body.

FIG. 2 shows a close up, exploded view of the safety cage assembly. A knife holder (50) and a clamp (60) are attached to a blade body (20) using nuts (80) and bolts (81) as a means of attachment. A knife member (40) is sandwiched between the knife holder (50) and the clamp (60). The clamp (60) has a slight overhang or lip (61) to couch the knife member (40). A positioning pin (51) on the knife holder (50) positions the knife member (40). The knife holder (50) and the clamp (60) can be extruded, injection molded, drop forged, milled, or ground from materials such as tool steel, aluminum, or injection molded plastics. The blade body can be injection molded, drop forged, milled, or ground from tool steel, aluminum, plastics, or fiberglass. The blade body can also be the existing lawnmower blade which has receiving holes drilled to accommodate the safety cage assembly (100).

Figure 3:
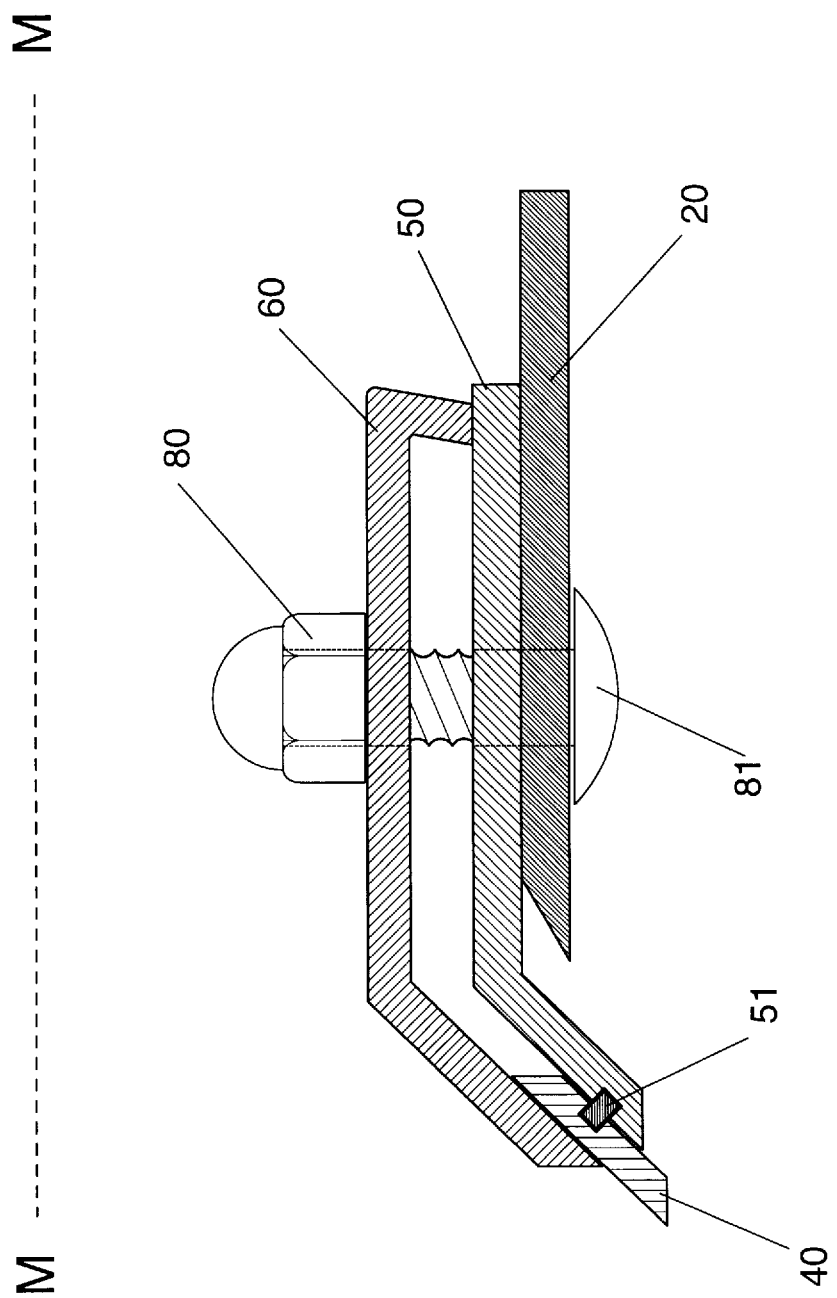
FIG. 3 Cross section of safety cage assembly mounted on body indicated by the section line M—M from FIG. 1.

FIG. 3 shows a cross sectional view of FIG. 1 along the line M—M where the clamp (60) and the holder (50) are mounted to the body (20) with nut (80) and bolt (81). The knife member (40) is positioned between the clamp (60) and the holder(50) by the positioning pin (51).

Figure 4:
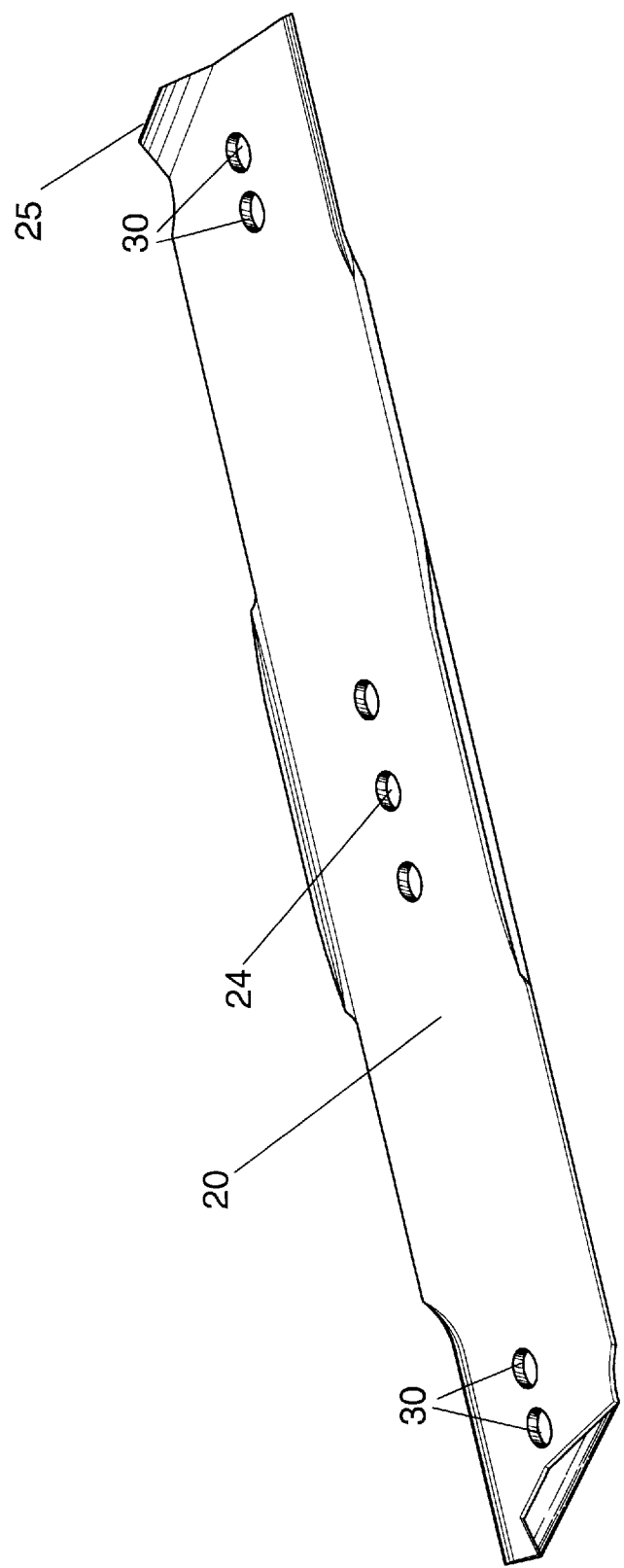
FIG. 4 Standard blade body modified to accept safety cage assembly.

FIG. 4 shows the standard blade body (20) with mounting holes (24) to mount the blade to a standard arbor. The blade body (20) may have two wings (25) to assist in clipping flow located at the outside edge on the trailing edge of the blade body (20). FIG. 4 also shows safety cage assembly holes (30) or assembly holes for mounting the safety cage assembly (100). This blade is configured to rotate clockwise but a blade can be configured to run counter clockwise as well. The blade may also be constructed with three or more elongated portions extending from the axis of rotation.

Figure 5:
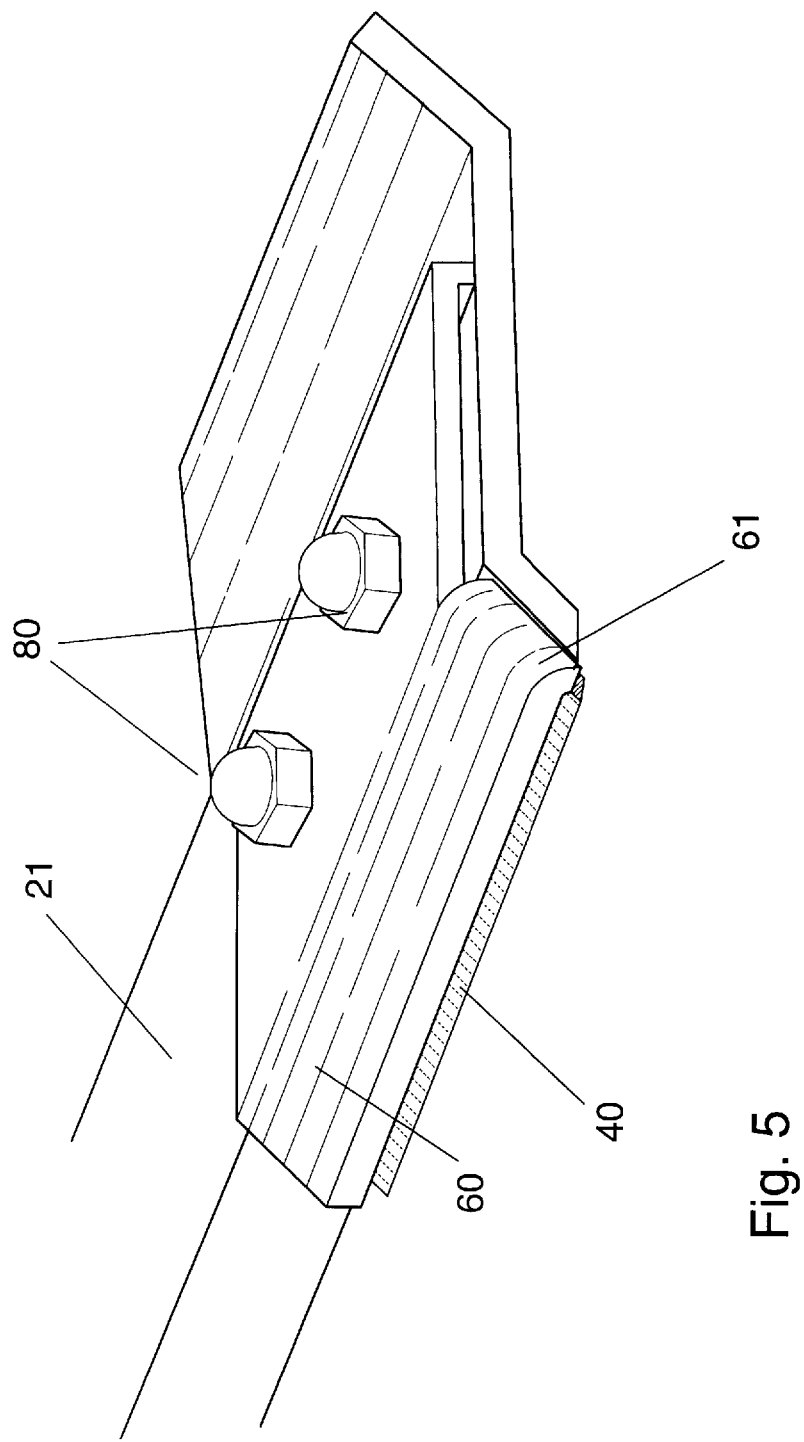
FIG. 5 Blade body with integrated holder.

FIG. 5 shows another assembled embodiment of our invention. FIG. 5 shows a blade body with an integrated knife holder (21) or a modified blade body. This embodiment eliminates the knife holder (50). The clamp (60), the nuts (80) and bolts (81), the positioning pins (51), and the knife member (40) remain unchanged.

Figure 6:
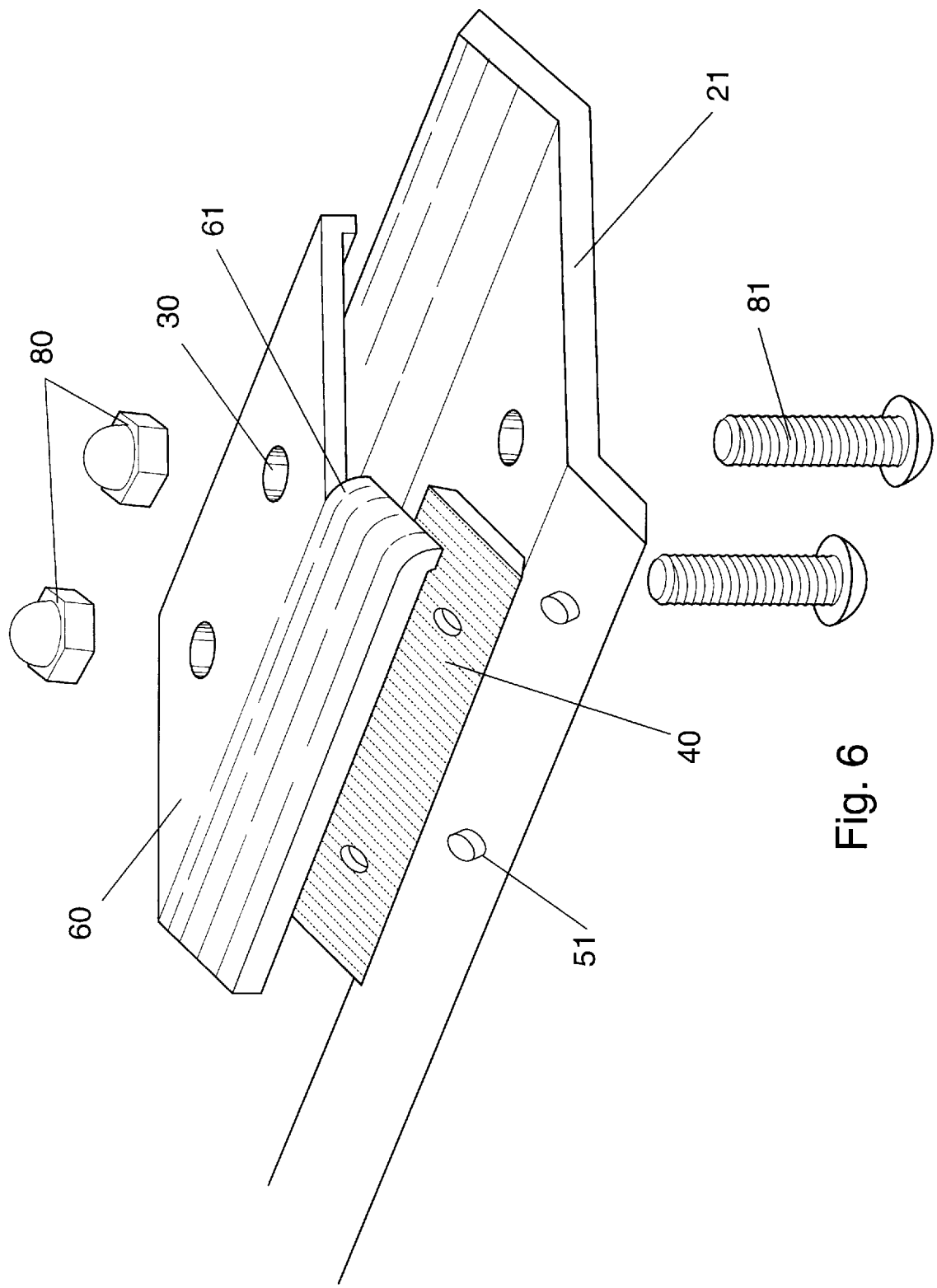
FIG. 6 Exploded view of FIG. 5.

FIG. 6 shows FIG. 5 in an exploded view.

Operation of FIGS. 1–6

By securely mounting the assembled invention of FIG. 1 on a rotary lawnmower in place of the traditional lawnmower blade, and operating the mower with its intended purpose, our invention will cut grass and other small growth vegetation. The safety cage assembly (100) securely positions the knife member (40) so that the cutting edge (141) is the first part of the device to contact the vegetation as it is rotating in a plane generally parallel to the ground on which the vegetation is growing. The cutting edge (141) will slice through the vegetation with the waste being expelled either through a chute or to the ground. The clamp (60) serves to hold the knife member (40) firmly to the knife holder (50) and to protect the knife member (40). The clamp (60) completely covers the knife member (40) leaving only 0.5 mm to 2 mm of the knife member's (40) cutting edge (141) exposed. This reduces the risk of damage to a knife member (40). This also gives added strength to a knife member (40) made from nylon or high speed steel. The clamp (60) will also contain the knife member (40) if the knife member (40) breaks from striking an object such as a rock or other solid item. The clamp (60) provides reasonable measures to reduce the danger of the knife member (40) becoming dislodged from the blade body (20). Furthermore our invention provides for two or more bolts to secure the safety cage assembly (100) to the blade body (20); none of the prior art make provisions for any kind of safety cage. This assembly (100) also permits the user to select from a variety of materials for the knife member (40), choices include but are not limited to various grades of carbide, high speed steel, other powder metals, plastics, polymer, carbide coated knives, diamond coated knives, and even diamond. None of the prior art make such provisions. By using the safety clamp assembly (100) of FIG. 1, a traditional blade can be converted to accepting the assembly (100) by drilling holes on each end; thereby, reducing the cost of producing a new blade and reducing the waste of discarding an old mower blade.

Figure 7:
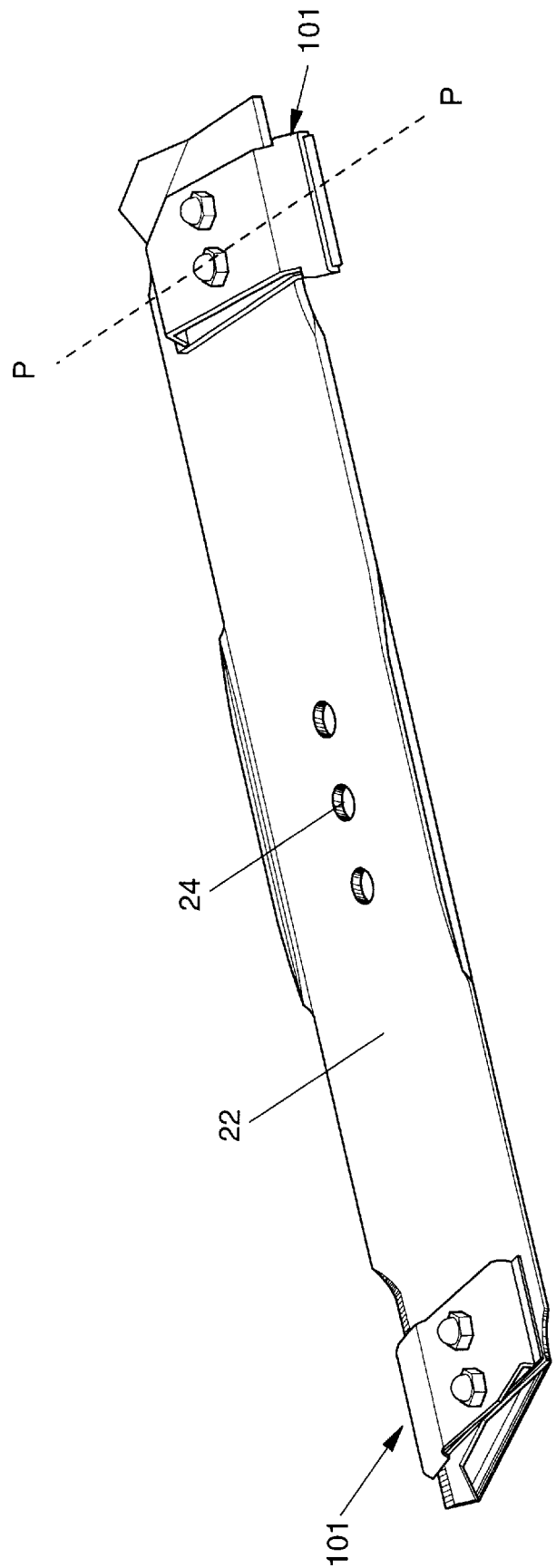
FIG. 7 Slidably attached blade body with slidably attached safety cage assembly installed.
Figure 7B:
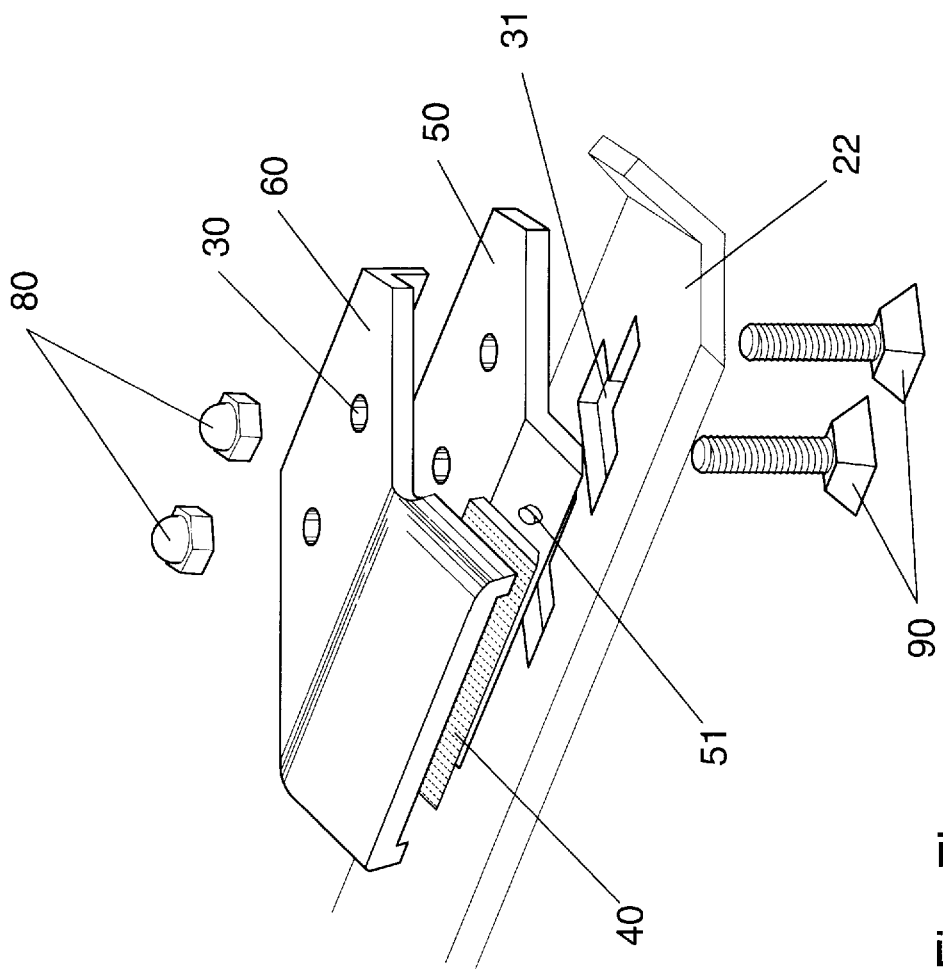
FIG. 7b Exploded view of slidably attached safety cage assembly and body using dovetail head bolts.
Figure 7C:
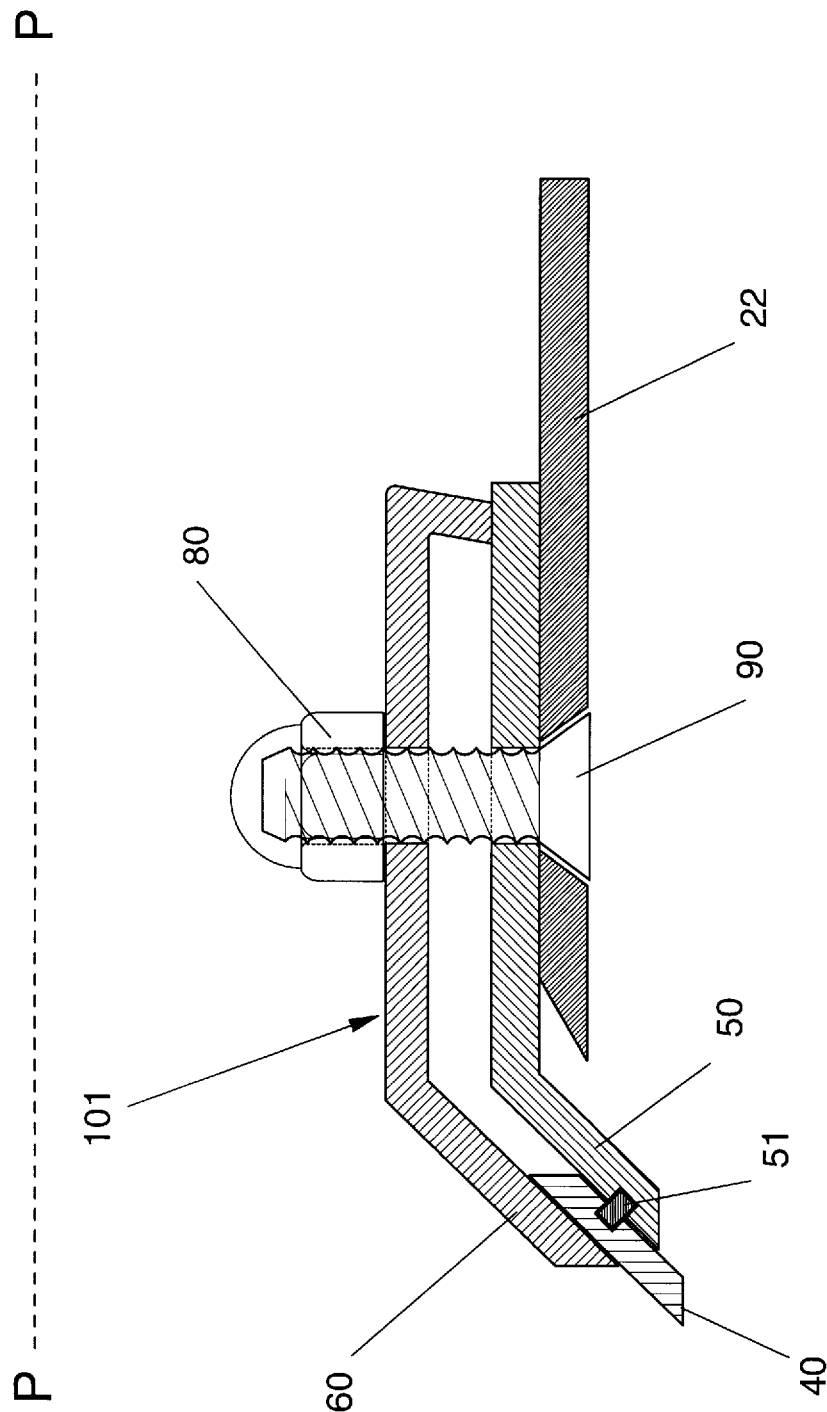
FIG. 7c Cross section of slidably attached safety cage assembly on slidably attached body along line P—P from FIG. 7.

Description of FIGS. 7–7c

FIG. 7 shows the slidably attached safety cartridge blade assembled. The safety cartridge blade utilizes a slidably attached safety cage assembly (101).

FIG. 7a shows the slidably attached blade (22) with square holes and dovetail slots (31)

FIG. 7b shows the safety cartridge blade in an exploded view. Note the dovetail headed bolts (90) which allow the slidably attached safety cage assembly (101) to attach to a slidably attached blade body (22) with a snap fit.

FIG. 7c shows the cross section of FIG. 7 along line P—P. Note the dovetail bolt (90) nesting in the dovetail slot of the slidably attached blade body(22).

Operation of FIGS. 7–7c

The device of FIGS. 7–7c operate the same way as the device of FIGS. 1–6 with the added feature of being able to remove the entire slidably attached safety cage assembly (101) from the slidably attached blade body (22). This permits the user to quickly exchange the assembly (101) and rotate or exchange the knife member (40) at another time or place. None of the prior art make such provisions.

Description of FIGS. 8a–b

FIG. 8a demonstrates another possible embodiment of our invention where the knife member (40) is inserted in a slot in the slotted blade body (23) and secured by two nuts (80) and bolts (82). FIG. 8b shows the countersink bolts used to secure the knife member (40) in the slotted blade body (23).

Operation of FIGS. 8a–b

By securely mounting the assembled invention of FIG. 8a on a rotary lawnmower in place of the traditional lawnmower blade, and operating the mower with its intended purpose, our invention will cut grass and other small growth vegetation. The slotted blade (23) securely positions the knife member (40) so that the cutting edge (40) is the first part of the device to contact the vegetation as it is rotating in a plane generally parallel to the ground on which the vegetation is growing. The cutting edge (40) will slice through the vegetation with the waste being expelled either through a chute or to the ground. The knife member (40) protrudes from the slot in the slotted body (23) by at least 0.5 mm. The knife member (40) can also protrude out the end of the slotted blade body (23) but could be fully contained on the end. Secured by two bolts which are countersunk into the bottom face of the slotted blade (23), the knife member (40)

is well protected, supported and contained. By employing a flexible material such as nylon for the knife member (40) in this device of FIG. 8a, more difficult applications could be accomplished such as mowing more rocky areas. The flexibility of the nylon will deflect upon striking rocks or allow the knife member (40) to flex over the rock or past the rock while still slicing through vegetation such as grasses and weeds.

Description of FIGS. 9a–9f

FIGS. 9a through 9f illustrate possible embodiments of the knife member. FIG. 9a shows a knife member with a single cutting edge (141) with two round pin holes (183) located concentric with the longitudinal midline and equidistant from the outside edges. FIG. 9b shows the knife member of FIG. 9a with 2 cutting edges (141). FIG. 9c shows the knife member of FIG. 9b where one of the pin holes is an elongated pin hole (184). FIG. 9d shows the knife member of FIG. 9b with 4 cutting edges (141). FIG. 9e shows a knife member with 3 cutting edges (141) and a single countersunk hole (185) in the center. FIG. 9f shows a square knife member with 4 cutting edges (141) and a single countersunk hole (185). Other possible variations would include but are not limited to knife members pictured in FIGS. 9a–d with countersunk holes (185) and/or more holes than pictured.

Operation of FIGS. 9a–9f

FIGS. 9a illustrates a knife member with a single cutting edge (141), this knife made from carbide or high speed steel would provide the basic replaceable knife. By providing two cutting edges, as FIG. 9b illustrates, the knife member has the advantage of two lifetimes, as this knife can be flipped and an unused cutting edge applied to cutting grass. The pin holes (183) of FIGS. 9a–9c are used to position and retain the knife in the knife holder (50) or on the body (21). The elongated pin hole (184) of FIG. 9c allows for more tolerance in placing the positioning pin. The countersunk holes (185) of FIGS. 9e and 9f are used to fasten the knife member to the embedded blade body (26) so that the countersunk screw does not extend below the plane of cut (Line C–D of FIG. 12a) and thus interfere with the clean cutting action of the knife member.

Description of FIGS. 10a–10d

Figure 10A:
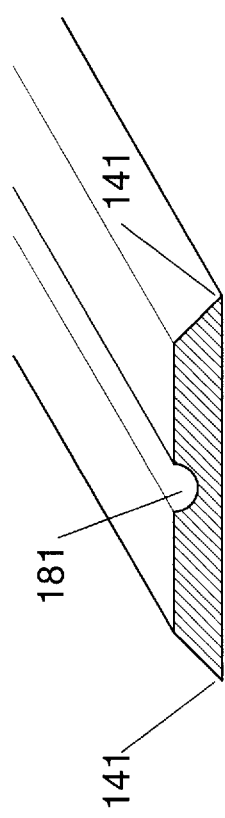
Figure 10B:
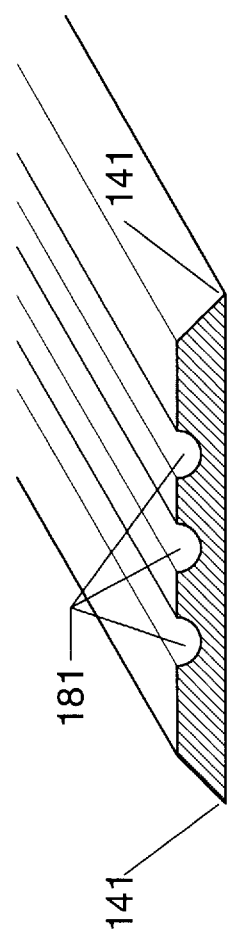

FIGS. 10a–d illustrate some features of the knife member which facilitate holding and positioning the knife member. FIG. 10a shows a single gully or groove (181) along the back of the knife. FIG. 10b shows multiple grooves (181) along the back of the knife. FIG. 10c shows the groove (181) along the face of the knife. FIG. 10d shows a plurality of corrugations (182) on the back of the knife. Other configurations could include but are not limited to a single corrugation on the back or face of the knife, a multiple of corrugations on the face of the knife, and even a combination of grooves, corrugations, straight holes, and countersunk holes.

Operation of FIGS. 10a–10d

FIGS. 10a–10d illustrate features of the knife member that would facilitate securely holding and properly positioning the knife member on the blade body or in the safety cage assembly. Corresponding grooves and corrugations on the holder (50) or cage (60) or body (21) would securely position the knife member in addition to, or instead of the positioning pins (51).

Description of FIGS. 11a–11c

FIGS. 11a–c Show possible variations of the cutting edges. FIG. 11a shows a straight cutting edge (141). FIG. 11b shows a scalloped cutting edge (142). FIG. 11c shows a serrated cutting edge (143).

Operation of FIGS. 11a–11c

The straight cutting edge (141) of FIG. 11a illustrates the basic cutting edge of the invention. The straight cutting edge is an edge which is beveled to a point or left blunt, or beveled from both surfaces, or left flat without a bevel. The scalloped cutting edge (142) and the serrated cutting edge (143) of FIGS. 11b–c would serve more to saw through the material to be cut, while the straight cutting edge (141) provides a slicing action. The knife members with the scalloped (142) or serrated (143) cutting edges set at a negative shear from FIG. 13a would be able to cut through larger, thicker vegetation such as brush, heavy weeds, even small trees due to the sawing action of the knife.

Description of FIGS. 12a–13c

Figure 12A:
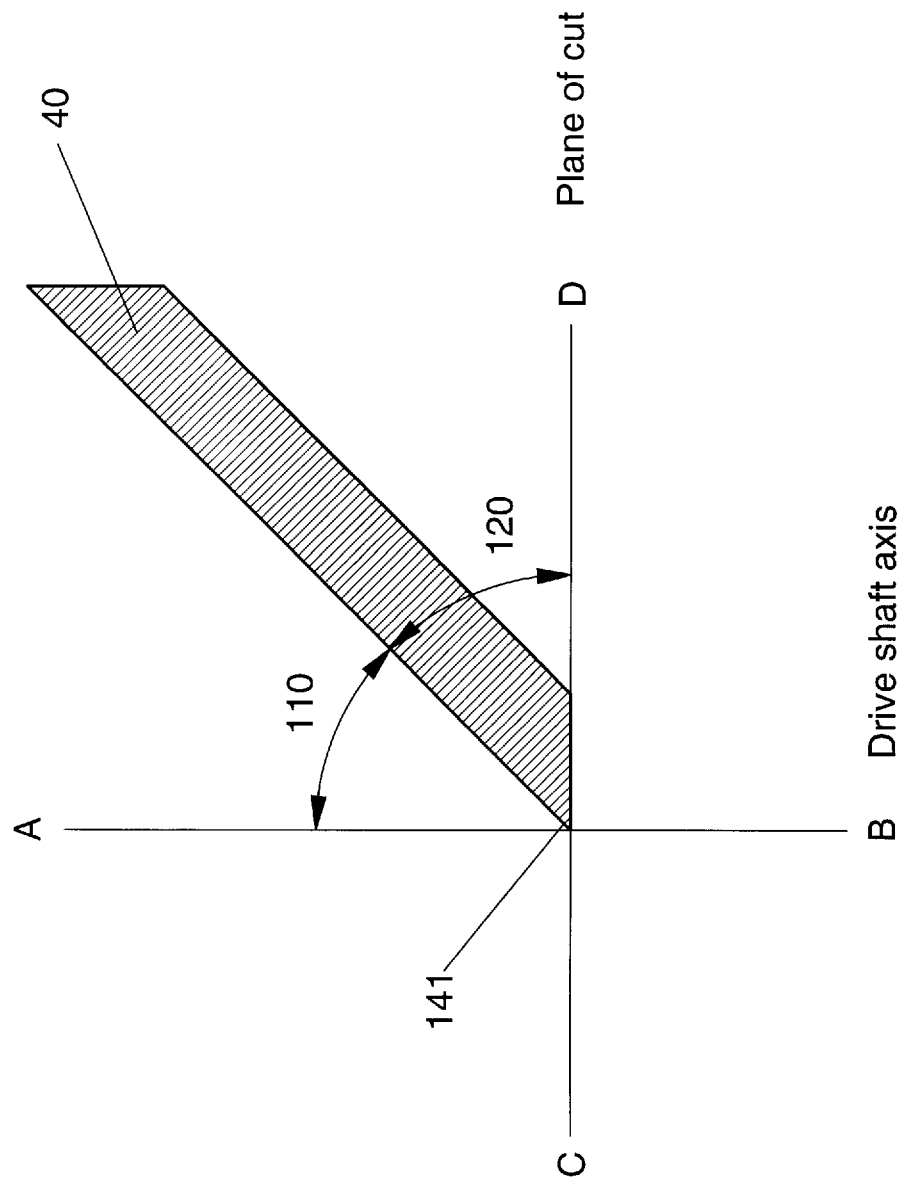
FIG. 12a Rake angle.

FIG. 12a identifies the rake angle (120) and the cut angle (110) of the knife member (40). Line A–B represents the axis of the drive shaft or center of rotation. Line C–D represents the plane of cutting action where the cutting edge (141) is the leading edge. Knife can also be inverted. Rake angle (120) can range from 0 degrees, with knife inverted, to 60 degrees positive.

FIG. 12b shows the free angle or clearance angle (130) of the knife member (40).

Figure 13A:
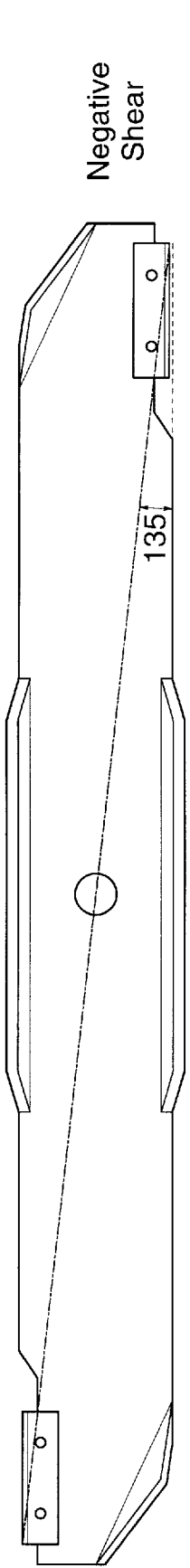
FIG. 13a–c Shear angles for positioning knife on blade body.
Figure 13B:
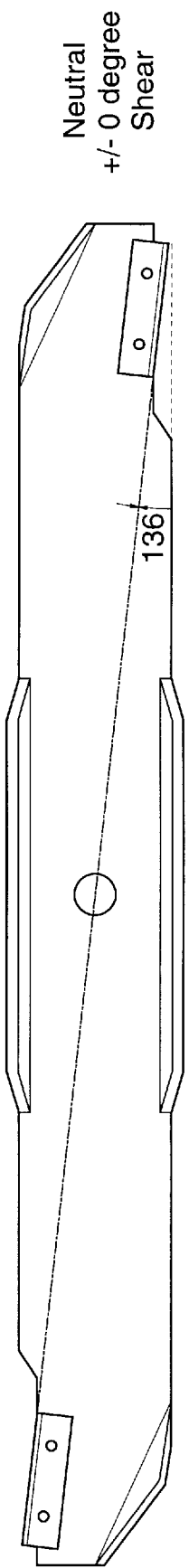
Figure 13C:
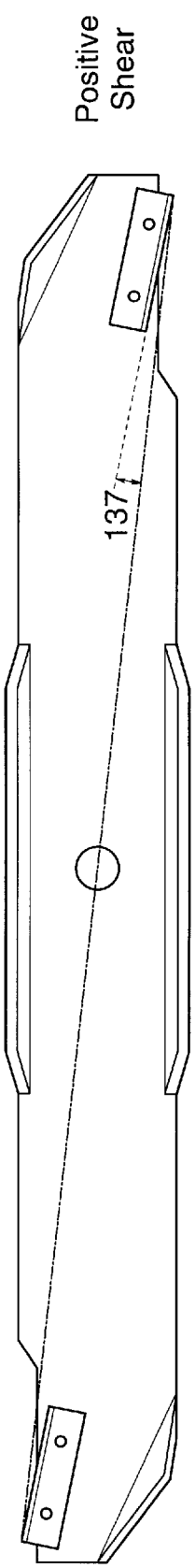

FIGS. 13a–c show the shear angle of the knife member (40) as it relates to the rotational vortex. FIG. 13a shows a negative shear angle (135). FIG. 13b shows a neutral shear angle (136). FIG. 13c shows a positive shear angle (137).

Operation of FIGS. 12a–13c

FIGS. 12a–b illustrate some of the important angles which need to be considered for positioning the knife. The cut angle (110) and the rake angle (120) determine how the cutting edge is oriented to the plane of cut (line C–D, FIG. 12a). A rake angle (120) from 0 degrees to 60 degrees will allow the cutting edge to cut. We prefer to invert the knife and set it at a rake angle of 0 to 15 degrees or in the safety cage assembly at a rake angle of 15 to 50 degrees. The clearance angle (130) illustrated in FIG. 12b can be from 0 to 89 degrees. Generally, the greater the angle the sharper the cutting edge, but also the weaker the cutting edge. We prefer an angle of 30 to 50 degrees. FIGS. 13a–c illustrate the shear angle. It is the angle created by the line that extends through the center of the axis of rotation to the furthest distal point on the cutting edge and the cutting edge itself. We prefer a negative (135) to a neutral (136) shear angle so that the maximum amount of the cutting edge is exposed to the grass. A positive shear (137) would be useful under certain dense growth applications.

Description of FIGS. 14a–15c

FIG. 14a shows another embodiment of our invention where the knife member is countersunk into the body of the blade. An embedded blade body (26) with countersinks to accommodate the four sided knife (170) snugly. The countersink bolts (82) nest inside the knife. This knife is square with a countersunk hole (185) in the center.

FIG. 14b shows an exploded view of the invention pictured in FIG. 14a.

Figure 14C:
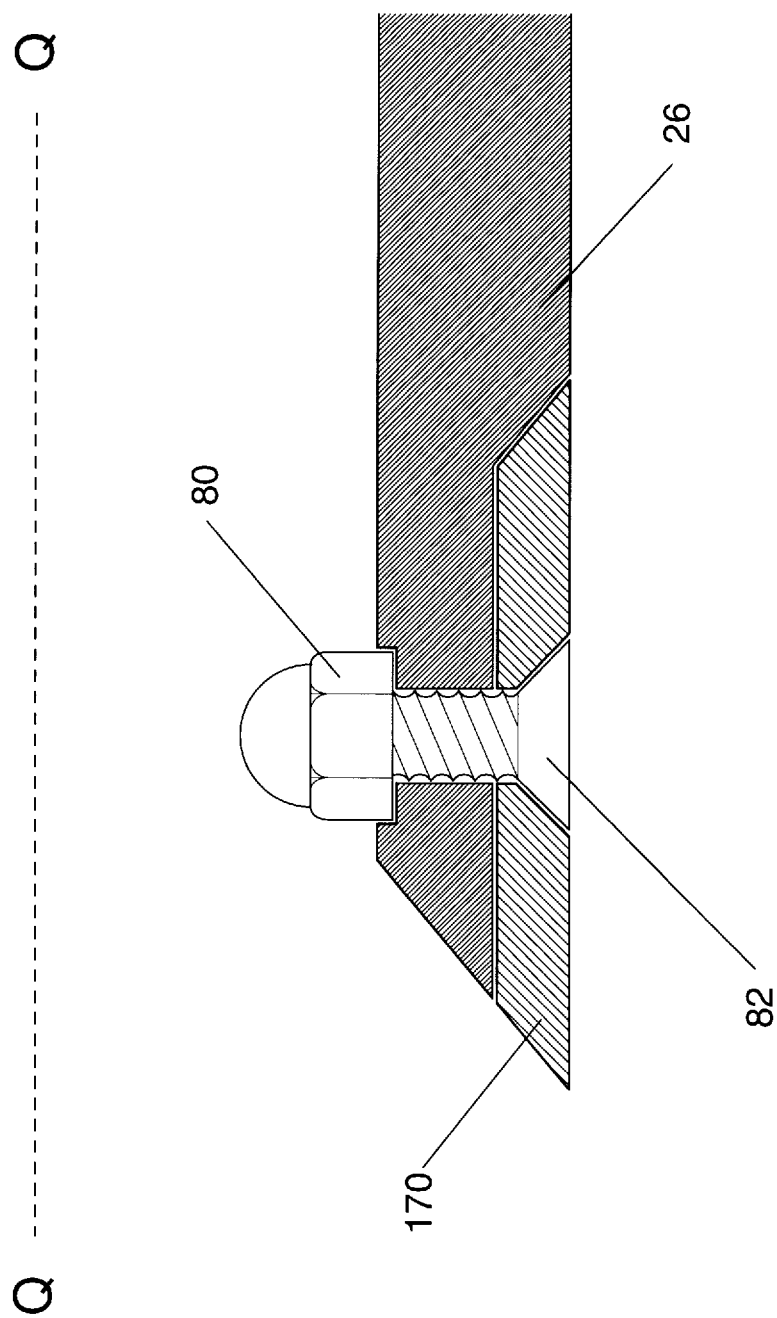

FIG. 14c shows the cross sectional view of the embedded knife embodiment of this invention in FIG. 14a along line Q—Q.

Figure 15A:
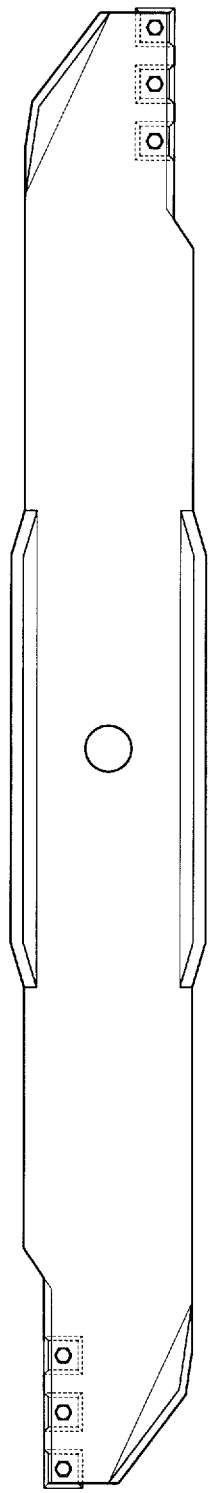

FIG. 15a shows the top view of the embodiment from FIG. 14a with three knife members on each leading edge.

Figure 15B:
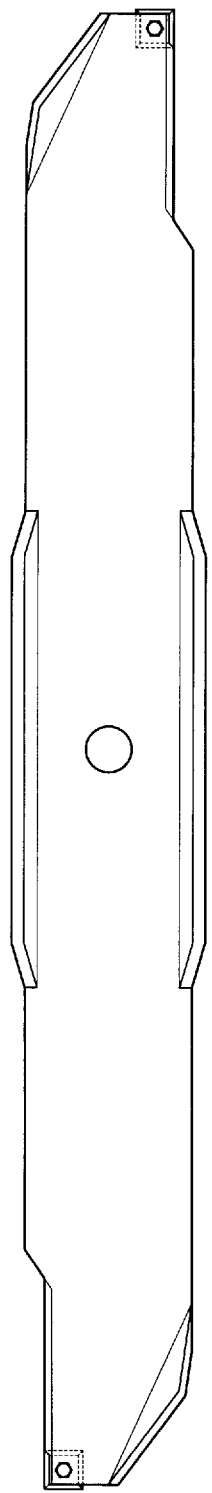

FIG. 15b shows the top view of the embedded knife embodiment with only one knife member on each leading edge located distally.

Figure 15C:
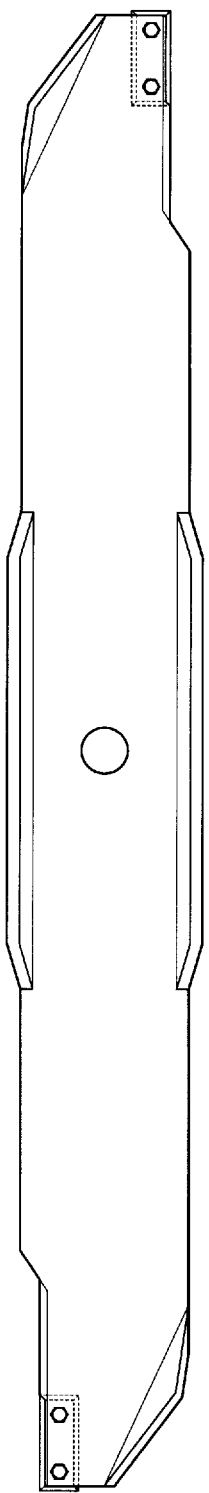

FIG. 15c shows the top view of the embedded knife embodiment with a knife member with two cutting edges located distally on each leading edge.

Operation of FIGS. 14a–15c

By securely mounting the assembled invention of FIG. 14a on a rotary lawnmower in place of the traditional lawnmower blade, and operating the mower with its intended purpose, our invention will cut grass and other small growth vegetation. The embedded blade (26) securely positions the knife member (40) so that the cutting edge (141) is the first part of the device to contact the vegetation as it is rotating in a plane generally parallel to the ground on which the vegetation is growing. The cutting edge (141) will slice through the vegetation with the waste being expelled either through a chute or to the ground. Utilizing resilient grades of carbide, which are less likely to break when encountering an object like a rock, the four sided knife (170) mounted to the embedded blade (26) with a rake angle (120) of 0 degrees provides a simple and cost effective way to bring the high cutting quality of carbide to lawnmowers and the like. The embedded blade (26) positions the four sided knife (170) properly and the counter sink bolts (82) securely hold the knife member in place and act to contain the pieces if the four sided knife (170) breaks. The same would hold true for other sizes of knives and other types like high speed steel, or nylon.

DESCRIPTION OF PREFERRED EMBODIMENT

We intend to use polycarbonate (or similar) in injection molding to reduce the cost of production per each individual part. For commercial or low volume use we may construct the embedded blade body (26) out of aircraft aluminum or tool steel. This blade body is shaped to allow the carbide or high speed steel knife member (40) to be mounted at the leading edge; couched in a countersink on the bottom facing surface of the embedded blade body (26). It has lifting wings to cause a vacuum for lifting the grass clippings and propelling them out through the chute to the bag. For mulching operations the lifting will be counteracted by a second wing which directs the grass clippings down again for disbursal to the ground.

Another preferred embodiment is that of FIG. 1. In which a standard blade body has a safety cage assembly attached on each side, located distally from the axis of rotation in such a way that the knife member extends beyond the leading edge.

The safety cage assembly will allow old lawnmower blades to be retro-fitted with the new invention.

CONCLUSION, RAMIFICATIONS, AND SCOPE OF INVENTION

The invention provides a highly reliable device to increase the quality of cut and cut edge durability. Both are extremely important factors to lawn care professionals and typical consumers. It also takes into account the related safety issues.

While our above description contains many specificities these should not be construed as limitations on the scope of the invention, but rather as an exemplification of preferred embodiments thereof. For example, different sizes could be used for the knife member, such as a 14 mm by 14 mm knife for the device of FIG. 14a or a 51 mm long knife in FIG. 15c. Various angles could be changed slightly with little affect to the results the invention produces.

Accordingly, the scope of the invention should be determined not by the embodiments illustrated, but by the appended claims and their legal equivalents.

We claim:

1. A device for cutting vegetation on a surface comprising of an elongated, oblate member or blade body of predetermined strength, length, width, and thickness, a means of mounting said blade body to a source of rotation so said blade body rotates in a plane with a broad surface facing up, said plane is parallel to the surface of vegetation, said plane is at a predetermined height to the surface of vegetation, and said blade body having at least one leading edge, said leading edge located on the forward facing direction of rotation of the blade body, and a trailing edge located on said blade body opposite the leading edge, and a knife member selected from the group consisting of carbide and high speed steel and chrome steels and powder metal knives, and said knife member having at least one cutting edge, and said knife member further includes at least one hole, and a safety cage assembly is used as a means for positioning the knife member at predetermined angles and location with respect to the blade body, said safety cage assembly having at least a knife member holder with at least one positioning pin, and a clamping member or clamp with a safety lip overhanging said knife member, with the knife member sandwiched between said knife member holder and said clamp, and a means of attaching said safety cage assembly to said blade body in such a way that said safety cage assembly protrudes a predetermined distance beyond the leading edge of said blade body, said safety cage assembly is located at predetermined locations on said blade body, said safety cage assembly contains said knife member in an event said knife breaks and is attached in a detachable manner.

2. The device for cutting vegetation of claim 1, wherein the blade body is produced from a material of suitable strength selected from the group consisting of plastics, and steels, and fiberglass, and polymers, whereby a lower production cost can be achieved.

3. The device for cutting vegetation of claim 1, wherein the knife member has a plurality of cutting edges which can be refreshed by rotating said knife member when at least one of said edges becomes dull.

4. The device for cutting vegetation of claim 1, wherein each cutting edge of the knife member is straight.

5. The device for cutting vegetation of claim 1 further including a plurality of knife members.

6. The device for cutting vegetation of claim 1 further including a plurality of safety cage assemblies.

7. The device for cutting vegetation of claim 1 wherein the safety cage assembly is slidably attached to the blade body by means of a plurality of dovetail headed bolts and dovetail slots in the blade body, whereby said knife member in the safety cage assembly can be replaced independent of the blade body, and said safety cage assembly can be attached and detached quickly.

8. The device for cutting vegetation of claim 1 wherein the cutting edge of the knife member is serrated.

9. The device for cutting vegetation of claim 1 wherein the cutting edge of the knife member is jagged or consisting of angled indentations in the cutting edge.

10. A device for cutting small growth vegetation such as turf grasses, on a surface comprising of a blade body of predetermined strength, 10–100 cm length, 1–35 cm width, and 0.1–20 mm thickness, and a means of mounting said blade body to a source of rotation so said blade body rotates in a plane with a broad surface facing up, said plane is parallel to the surface of vegetation, said plane is at a height so as to intersect the vegetation on a surface at a height of 0–30 cm to the surface of vegetation, and said blade body having at least one leading edge, said leading edge located on the forward facing direction of rotation of the blade body, and a trailing edge located on said blade body opposite the leading edge, and a knife member selected from the group consisting of carbide and high speed steel and powder metal knives, and said knife member having at least one cutting edge, and a safety cage assembly is used as a means for positioning the knife at a rake angle of 1–45 degrees and shear angle of minus 20 to plus 20 degrees, in such a way that said knife member can be rotated and replaced, said cutting edge protrudes at least 0.1 mm from the leading edge, said safety cage assembly having at least a knife member holder with at least one positioning pin, and a clamping member or clamp with a safety lip overhanging said knife member, with the knife member sandwiched between said knife member holder and said clamp, and a means of attaching said safety cage assembly to said elongated member in such a way that said safety cage assembly protrudes a predetermined distance beyond the leading edge of said blade body, said safety cage assembly is positioned at a distal location on said blade body, said safety cage assembly is attached in such manner so as to allow said knife member to be rotated and replaced under predetermined conditions, whereby said knife member is contained in an event said knife member breaks.

11. The device for cutting small growth vegetation from claim 10, further including a plurality of knife members.

\* \* \* \* \*